Sept. 5, 1961  G. H. MEIER  2,998,868
DAMPING DEVICE
Filed Nov. 17, 1958  2 Sheets-Sheet 1

Inventor
Ghert Henri Meier
By
Michael S. Striker
Attorney

Sept. 5, 1961         G. H. MEIER         2,998,868
DAMPING DEVICE

Filed Nov. 17, 1958                                      2 Sheets-Sheet 2

United States Patent Office 2,998,868
Patented Sept. 5, 1961

2,998,868
DAMPING DEVICE
Ghert Henri Meier, Zurich, Switzerland, assignor to
Contraves A.G., Zurich, Switzerland
Filed Nov. 17, 1958, Ser. No. 774,231
Claims priority, application Switzerland Mar. 31, 1958
16 Claims. (Cl. 188—90)

The present invention relates to oscillation damping devices and more particularly to a device for damping the oscillations of a rotary system.

An example of a rotary system for which the device of the invention is eminently suitable is a rotary indicating arrangement in a measuring instrument which is pivotally deflected by actuating means sensitive to the variable which is to be measured and returned to a null position by resilient means. Such a system tends to oscillate unless equipped with a damping device and the operating characteristics and sensitivity of the instrument may greatly depend on the damping device.

It is an object of the invention to provide such a damping device which does not interfere with the sensitivity of an instrument to which it is applied.

Another object is the provision of such a damping device the damping characteristics of which may readily be adjusted.

A further object of the invention is the provision of a damping device which is insensitive to changes in ambient conditions.

Yet another object of the invention is to provide a damping device containing but a minimum number of mechanical elements.

An additional object of the invention is the provision of such a device the mechanical elements of which are sturdy and of extreme simplicity so as to make the device rugged and reliable in operation, and relatively inexpensive to manufacture.

Other objects and many of the attendant advantages of this invention will be readily appreciated as the same becomes better understood by reference to the following detailed description when considered in connection with the accompanying drawings in which reference numerals having the last two digits in common designate like or corresponding parts throughout the several figures thereof, and wherein.

In its more specific aspects, the invention contemplates providing rotatably movable members of a rotary system having damping portions with respective opposite surfaces extending transversely of the axis of rotation so as to face each other. The surfaces are adjacently spaced from each other and so shaped as to define therebetween a space extending about the axis of rotation and increasing in axial thickness in a direction radially outward from the axis. A damping disc of a viscous liquid material is held in the space formed between the damping portions and is retained therein by capillary attraction between the viscous liquid and the oppositely facing surfaces of the damping portions.

The novel features which are considered characteristic of the invention are set forth in particular in the appended claims. The invention itself, however, both as to its structure and its method of operation together with additional objects and advantages thereof, will be best understood from the following detailed description of specific embodiments thereof.

Figure 1:
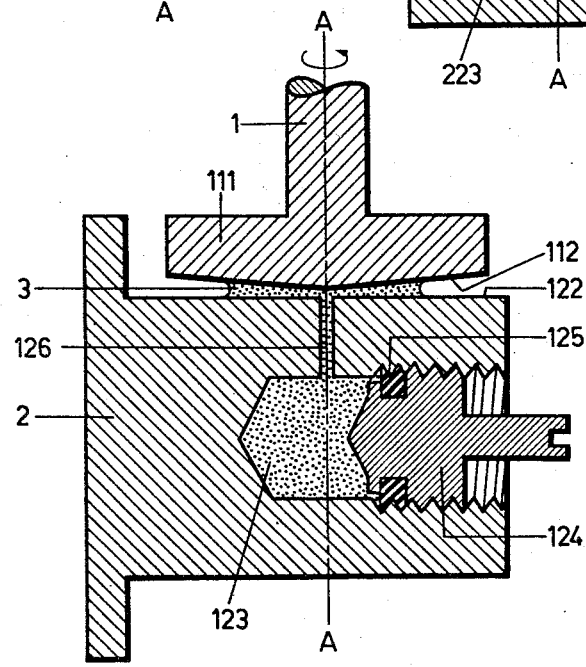
FIG. 1 is an axial section through a rotary system equipped with a preferred embodiment of the invention.

Referring now to the drawings and more particularly to FIG. 1, there is shown a rotary member 1, the rotary oscillations of which it is intended to damp. Member 1 is capable of rotary movement about axis A—A relative to a member 2 which for the purposes of the description of the embodiment of the invention illustrated in the figures of the drawing will be considered stationary although it will be readily understood that the member 2 may be equally rotatable about axis A in a direction equal to the direction of rotation of member 1, but at a different speed, or may rotate in a direction opposite to the direction of rotation of member 1 without in any manner influencing the operation of the inventive device.

The plane top surface 122 of member 2 faces a conical surface 112 of a damping portion 111 of rotary member 1 so that between surfaces 112 and 122 there is formed a space 3 symmetrical relative to the axis of rotation A—A, of capillary thickness at least at the axis thereof and increasing in thickness radially outward from the axis A—A in a gradual and uniform manner. Fixed member 2 is formed with a cavity 123 having an opening to the atmosphere in a surface remote from damping surface 122, the opening being plugged by a threadedly inserted plug member 124 sealing the cavity 123 by means of a resilient threaded gasket 125, the position of which is adjustable in the axial direction of plug member 124 by rotation thereof on its threads. Threading movement of plug 124 may be actuated by engaging a radial slot in the stem portion of the plug with a screw driver or the like for rotation of the plug, whereby the effective volume of cavity 123 may be closely adjusted.

A viscous liquid completely fills cavity 123 and overflows into the space 3 formed between surfaces 112 and 122 through a passage 126 arranged in member 2 coaxial with the axis of rotation A—A. The body of liquid overflowing into the space 3 is held therein by capillary attraction between the liquid and surfaces 112 and 122 respectively, and is precisely centered with respect to the axis A—A by the symmetrical configuration of space 3 and by the surface tension of the free surface of the liquid between damping surfaces 112 and 122.

The liquid to be employed for coaction with members 1 and 2 must be of such a nature as to wet surfaces 112 and 122 so that the meniscus formed by the free surface of the liquid between the surfaces 112 and 122 is of concave shape. The radial dimension of space 3 which can be completely filled with the liquid and the maximum distance between the damping surfaces 111 and 112 between which the liquid will be held by capillary attraction, is determined by the surface properties of the damping portions and of the liquid itself which define the wetting angle between the liquid and the solid surfaces, and the surface tension of the liquid which together constitute the capillary properties of the surfaces of the damping portions and of the liquid.

The liquid preferred for use in the device of the invention is a silicone oil of a viscosity which has to be chosen to suit the requirements of the specific rotary system in conjunction with which the damping device of the invention is to be employed. Such a silicone oil has the very desirable properties of being chemically inert both to the atmosphere and to most of the common materials of construction, and particularly to metals, from which rotary systems of instruments are commonly built, of changing in viscosity relatively little with the temperature of the device, of having a low vapor pressure over a wide temperature range and of having a relatively low co-efficient of thermal expansion.

It will be understood, though, that in any specific case other liquids may be chosen to suit the specific requirements which may not involve any one of the properties which usually make silicone oils a preferred liquid damping medium, and such liquids will readily suggest themselves to one skilled in the art as prevailing conditions may require.

The afore-described device owes its damping effect to the internal friction or viscosity of the liquid held in space 3 under the shearing stresses set up in the disc of liquid between surfaces 112 and 122 by relative rotary movement of the surfaces. The magnitude of the damping effect is a function of the overall thickness of the liquid disc, of its radial width, of its configuration, and of its viscosity. It is apparent that thermal changes will influence the radial dimension and the viscosity of a damping liquid having a positive thermal co-efficient of expansion in such a manner that the effects of the radial thermal expansion and of the thermal decrease of viscosity will tend to cancel each other. Increasing temperature will cause the liquid to expand in a radial direction while at the same time decreasing its viscosity. The effective volume of cavity 123 and the amount of liquid held therein may be adjusted for any given liquid and for any given size and configuration of space 3 so as virtually to balance the respective thermal variation of size and viscosity of the damping disc held in the space 3 if such balancing is desired.

It is preferred to make the space 3 symmetrical with respect to axis A—A so that centrifugal forces set up within the liquid disc during relative rotation of members 1 and 2 will balance. It will be understood, though, that the effect of unbalanced centrifugal forces which may tend to throw portions of the damping disc radially outward of space 3 so as to separate them from the main body of liquid may be checked by providing a retaining means in contact with portions of the free surface of the damping disc between surfaces 112 and 122 without departing from the scope and spirit of this invention.

The damping characteristics of the liquid disc may further be compensated for thermal variations in viscosity of the damping liquid by varying the axial thickness of the liquid damping disc. This can be accomplished by making at least an axially extending portion of one of members 1 and 2 of a material of a co-efficient of expansion higher than that of other structural elements which supportingly connect the damping portions of members 1 and 2 so that upon an increase in temperature, members 1 and 2 will axially move towards each other, decreasing the thickness of the liquid damping disc in space 3 and thereby increasing the damping effect of the disc. Such a decrease in thickness may be accompanied by a simultaneous increase in the radial width of the disc which will further tend to increase the damping effect so that a relatively small relative axial movement of members 1 and 2 may cause a substantial increase in the damping effect of the system at constant viscosity of the liquid, or a strong compensating effect on a decrease in damping effect due to thermal reduction of the viscosity of the damping liquid.

The damping device of the invention is preferably operated in such a manner that the liquid damping disc radially extends in a substantially horizontal direction, and such an arrangement permits a very wide choice in the capillary properties of the liquid and the confining surfaces 112 and 122. It will be understood though that the damping disc may be arranged so as to be radially inclined to or substantially perpendicular to a horizontal plane if the capillary properties and the dimensions of the damping system are suitably selected in order to make the capillary forces set up sufficiently great relative to the gravitational forces exerted on the damping liquid so that the effects of gravity are negligible for practical purposes.

Figure 2:
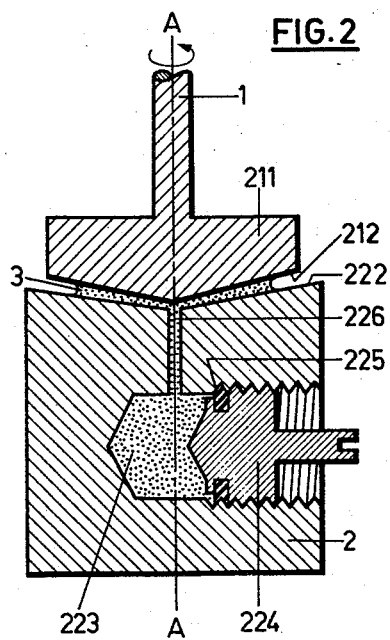
FIG. 2 shows in axial section a rotary system provided with a modified embodiment of the damping device of the invention.

The device of the invention illustrated in FIG. 2 is similar to that shown in FIG. 1 and operates in a basically similar manner. The surfaces 212 and 222 which between themselves define the space 3, however, are both of conical shape coaxial with respect to the axis of rotation of member 1, one being positively conically shaped, the other negatively conical, so that the body of liquid held between the surfaces is centered about the axis of rotation of member 1 not only by the surface tension effective along the free annular surface of the disc of the damping liquid, but also by the force of gravity when the device is arranged with the axis of rotation in a vertical position.

Figure 3:
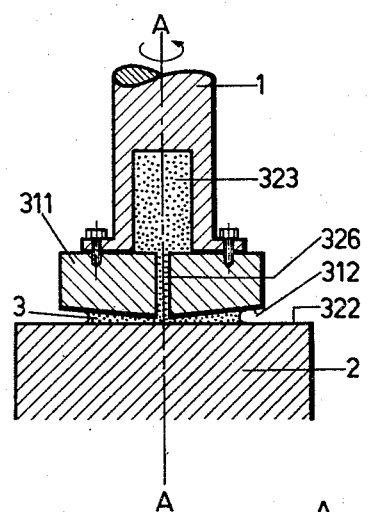
FIG. 3 shows an axial section of yet another rotary system including a third modification of the damping device of the invention.

In the embodiment illustrated in FIG. 3 the cavity 323 is provided in the rotary member 1 rather than in the fixed member 2 and has a predetermined volume not adjustable such as may be convenient and less expensive to manufacture in the mass production of an instrument for which the dimensions and the range of operational conditions are predictable in advance. The damping portion 311 of rotary member 1 is not integral with member 1 as was shown in FIGS. 1 and 2, but is of a different material having a different co-efficient of thermal expansion of that of member 1 and is fixedly secured thereto. If the instrument is generally constructed of steel, damping portion 311 may, for example, be made of aluminum further to compensate for a negative thermal change in the viscosity of the liquid in damping space 3, as far as such a decrease in viscosity is not balanced by thermal expansion of the liquid in cavity 323, passage 326 and space 3, and corresponding increase of radial width of the disc.

Figure 4:
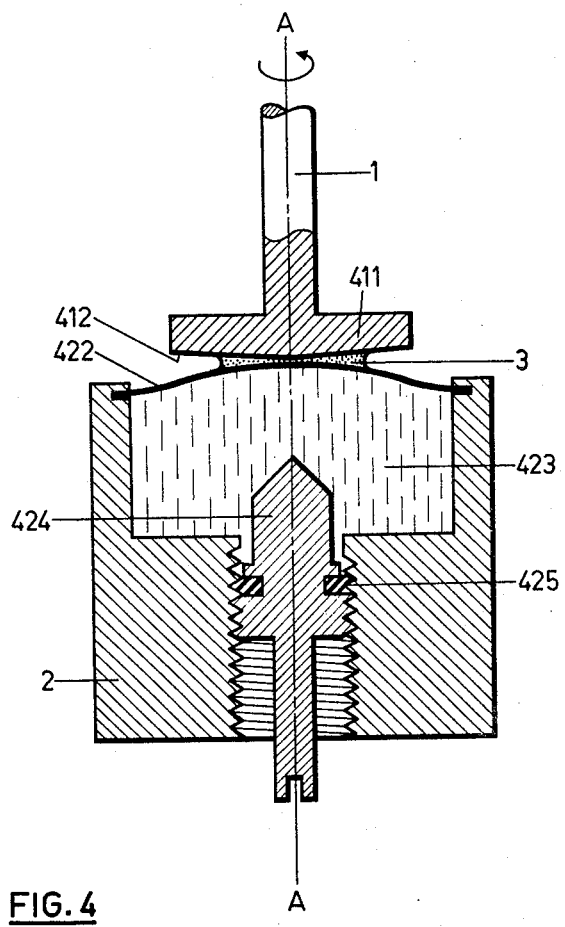
FIG. 4 is an axial section of an additional rotary system having a damping device of the invention.

In the embodiment of the invention illustrated in FIG. 4, the thickness and shape of a liquid damping disc held in a space 3 may be varied. The damping space 3 of FIG. 4 is confined between a conical surface 412 of the damping portion 411 of a rotary member 1 and a domed, curved surface of a membrane 422 of yieldably resilient material forming the surface of fixed member 2 facing damping surface 412 of damping member 411, and arranged symmetrically about the axis A—A of rotation of the latter.

Membrane 422 confines a body of fluid in a cavity 423 in fixed member 2. The effective volume of cavity 423 may be adjusted by rotation of a plug member 424 analogous in structure and operation to plug member 124 of FIG. 1. Axial displacement of plug member 422 varies the volume of cavity 423 and thus the pressure exerted between the walls of the cavity and the fluid contained therein so that the curvature of resilient membrance 422 may be varied by adjustment of plug member 424.

Thermal changes in the volume or in the pressure of the fluid contained in cavity 423 will also tend axially to displace membrane 422 so as to vary the axial thickness of damping space 3 and of the liquid damping disc contained therein. If the volume of the damping disc is fixed or variable only within relatively narrow limits under the influence of temperature variations, such change in axial thickness of the disc will correspondingly vary the radial width thereof. The fluid contained in cavity 423, the elastic properties of membrane 422, the thermal properties of the damping liquid, and the dimensions of the apparatus may readily be selected so as to achieve any desired thermal balance or imbalance of the damping effect produced by the damping device of FIG. 4.

The fluid contained in cavity 423 may be any liquid compatible with the materials of construction of the walls of cavity 423. It may for example be a liquid petroleum fraction of preferably high viscosity so as to minimize the danger of leakage past sealing gasket 425. This gasket and membrane 422 may for example be made of one of the oil-resistant chloroprene polymers commonly available under the name neoprene.

It will be apparent that the fluid contained in cavity 423 may also be of a partially or entirely gaseous nature, and the use of such a gaseous fluid is specifically contemplated.

It will be understood that each of the elements described above, or two or more together, may also find a useful application in other types of damping device differing from the types described above.

While the invention has been illustrated and described as embodied in a device having members rotatably movable relative to each other, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and adjacently spaced therefrom, said damping surfaces defining therebetween a continuous uninterrupted space extending about and through said axis and continuously increasing in axial thickness in a direction radially outward from said axis; and a body of liquid filling said space and held centrally between said surfaces by capillary attraction thereto regardless of the position of said damping device.

2. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and adjacently spacer therefrom, said damping surfaces defining therebetween a continuous uninterrupted space symmetrically extending about and through said axis and continuously increasing in axial thickness in a direction radially outward from said axis; and a body of liquid filling said space and held centrally between said surfaces by capillary attraction thereto regardless of the position of said damping device.

3. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and axially spaced therefrom by a predetermined distance, said damping surfaces defining therebetween a continuous uninterrupted space extending about and through said axis and continuously increasing in axial thickness in a direction radially outward from said axis; and a body of liquid filling said space and held centrally between said surfaces by capillary attraction thereto regardless of the position of said damping device, the capillary properties of said damping surfaces and of said liquid determining the maximum distance at which said damping surfaces may be placed so as to hold said liquid therebetween, said predetermined distance being less than said maximum distance.

4. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and adjacently spaced therefrom, said damping surfaces defining therebetween a continuous uninterrupted space extending about and through said axis, said space being of capillary dimensions in an area adjacent said axis and continuously increasing in axial thickness in a direction radially outward from said axis; and a body of liquid filling said space and held centrally between said surfaces by capillary attraction thereto regardless of the position of said damping device.

5. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and adjacently spaced therefrom, said damping surfaces defining therebetween a continuous uninterrupted space extending about and through said axis and uniformly increasing in axial thickness in a direction radially outward from said axis; and a body of liquid filling said space and held centrally between said surfaces by capillary attraction thereto regardless of the position of said damping device.

6. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and adjacently spaced therefrom, said damping surfaces defining therebetween a continuous uninterrupted space extending about and through said axis and continuously increasing in axial thickness in a direction radially outward from said axis, one of said damping surfaces having a conical surface symmetrically arranged about said axis having an obtuse apex angle and facing the other of said damping surfaces; and a body of liquid filling said space and held centrally between said surfaces by capillary attraction thereto regardless of the position of said damping device.

7. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and adjacently spaced therefrom, said damping surfaces defining therebetween a continuous uninterrupted space extending about and through said axis and continuously increasing in axial thickness in a direction radially outward from said axis, one of said members being formed with a cavity therein and with a passage connecting said cavity and said space defined between said damping surfaces; and a body of liquid filling said cavity, said passage, and said space and held centrally between said surfaces by capillary attraction thereto regardless of the position of said damping device.

8. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and adjacently spaced therefrom, said damping surfaces defining therebetween a continuous uninterrupted space extending about and through said axis and continuously increasing in axial thickness in a direction radially outward from said axis, one of said members being formed with a cavity therein defined by rigid wall portions of said member and with an axial passage connecting said cavity and said space defined between said damping surfaces; and a body of liquid filling said cavity, said passage, and said space and held centrally between said surfaces by capillary attraction thereto regardless of the position of said damping device.

9. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and adjacently spaced therefrom, said damping surfaces defining therebetween a continuous uninterrupted space extending about and through said axis and continuously increasing in axial thickness in a direction radially outward from said axis, one of said damping surfaces being a convex surface symmetrically arranged about said axis and facing the other of said damping surfaces; and a body of liquid filling said space and held centrally between said surfaces by capillary attraction thereto regardless of the position of said damping device.

10. A damping device for damping oscillations of a rotary system, comprising in combination: a rotary member rotatable about an axis and having a damping portion extending transversely of said axis; a damping member having a damping portion extending transversely of said axis, facing the damping portion of said rotary member and adjacently spaced therefrom, said damping portions defining therebetween a continuous uninterrupted space extending about and through said axis and increasing in axial thickness in a direction radially outward from said axis, one of said damping portions having a convex surface symmetrically arranged about said axis and facing the other of said damping portions; means for varying the curvature of said convex surface; and a body of liquid filling said space and held between said portions by capillary attraction thereto.

11. A damping device for damping oscillations of a rotary system, comprising in combination: a rotary member rotatable about an axis and having a damping portion extending transversely of said axis; a damping member having a damping portion extending transversely of said axis, facing the damping portion of said rotary member and adjacently spaced therefrom, said damping portions defining therebetween a continuous uninterrupted space extending about and through said axis and continuously increasing in axial thickness in a direction radially outward from said axis, one of said members being formed with a cavity therein and with a passage connecting said cavity and said space defined between said damping portions; means for adjusting the volume of said cavity; and a body of liquid filling said cavity, said passage, and said space and held centrally between said portions by capillary attraction thereto regardless of the position of said damping device.

12. A damping device for damping oscillations of a rotary system, comprising in combination: a rotary member rotatable about an axis and having a damping portion extending transversely of said axis; a damping member having a damping portion extending transversely of said axis, facing the damping portion of said rotary member and adjacently spaced therefrom, said damping portions defining therebetween a continuous uninterrupted space extending about and through said axis and continuously increasing in axial thickness in a direction radially outward from said axis; means sensitive only to temperature variations for varying the axial spacing of said damping portions; and a body of liquid filling said space and held centrally between said portions by capillary attraction thereto regardless of the position of said damping device.

13. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and adjacently spaced therefrom, said damping surfaces defining therebetween a continuous uninterrupted space extending about and through said axis and continuously increasing in axial thickness in a direction radially outward from said axis; and a body of viscous liquid filling said space and held centrally between said surfaces by capillary attraction thereto regardless of the position of said damping device.

14. A damping device for damping oscillations of a rotary system, comprising in combination: a rotary member rotatable about an axis and having a damping surface extending transversely of said axis; a damping member having a damping surface extending transversely of said axis, facing the damping surface of said rotary member and adjacently spaced therefrom, said damping surfaces defining therebetween a continuous uninterrupted space extending about and through said axis and continuously increasing in axial thickness in a direction radially outward from said axis; and a body of liquid filling said space and held centrally between said surfaces by capillary attraction thereto, regardless of the position of said damping device, said liquid having an annular concave free surface extending between said members about said axis.

15. A damping device for damping oscillations of a rotary system comprising, in combination, a rotary member rotatable about an axis and having a damping face extending transversely of said axis; a damping member having a damping face extending transversely of said axis, facing said damping face of said rotary member and adjacently spaced therefrom, said damping faces defining therebetween a continuous uninterrupted space extending through and symmetrically about said axis and uniformly increasing in axial thickness in a direction radially outward from said axis, at least one of said damping faces being a conical face symmetrically about said axis and having an obtuse apex angle of nearly 180°; and a body of liquid filling said space and held between said damping faces by capillary attraction thereto.

16. A damping device for damping oscillations of a rotary system comprising, in combination, a rotary member rotatable about an axis and having a damping face; a damping member having a damping face facing said damping face of said rotary member and being adjacently spaced therefrom, one of said damping faces being normal to said axis and the other of said damping faces being a conical face symmetrically about said axis and having an obtuse apex angle of nearly 180°, said damping faces defining between themselves a continuous uninterrupted space extending through and symmetrically about said axis and uniformly increasing in axial thickness in a direction radially outward from said axis; and a body of liquid filling said space and held between said damping faces by capillary attraction thereto.

References Cited in the file of this patent

UNITED STATES PATENTS

| | | |
|---|---|---|
| 464,949 | Alden | Dec. 15, 1891 |
| 793,035 | Kitsee | June 20, 1905 |
| 2,080,279 | Kellogg | May 11, 1937 |
| 2,182,076 | Elmer | Dec. 5, 1939 |
| 2,417,282 | Wheeler | Mar. 11, 1947 |
| 2,420,360 | Deming | May 13, 1947 |
| 2,661,913 | Heizer et al. | Dec. 8, 1953 |

FOREIGN PATENTS

| | | |
|---|---|---|
| 484,667 | Canada | July 8, 1952 |

OTHER REFERENCES

Publication: "Product Engineering," January 1950, pages 90–93.